(12) United States Patent
Isaac

(10) Patent No.: US 7,473,169 B2
(45) Date of Patent: Jan. 6, 2009

(54) ADJUSTABLE AXIAL ROTOR DISCHARGE DEFLECTOR

(75) Inventor: Nathan E. Isaac, Leola, PA (US)

(73) Assignee: CNH America LLC, New Holland, PA (US)

( * ) Notice: Subject to any disclaimer, the term of this patent is extended or adjusted under 35 U.S.C. 154(b) by 17 days.

(21) Appl. No.: 11/712,047

(22) Filed: Feb. 28, 2007

(65) Prior Publication Data

US 2008/0207288 A1    Aug. 28, 2008

(51) Int. Cl.
*A01F 7/06* (2006.01)
*A01F 12/44* (2006.01)

(52) U.S. Cl. ........................................ 460/80

(58) Field of Classification Search ............. 460/80, 460/111, 112, 901; 239/661, 653, 681, 682, 239/675
See application file for complete search history.

(56) References Cited

U.S. PATENT DOCUMENTS

| | | | |
|---|---|---|---|
| 318,142 A | 5/1885 | Schafer | |
| RE11,965 E | 2/1902 | Flagg | |
| 764,669 A | 7/1904 | Metz | |
| 938,139 A | 10/1909 | Gotshall | |
| 2,073,302 A | 3/1937 | Gilman | 130/6 |
| 3,074,415 A | 1/1963 | Davidson | 131/145 |
| 3,677,540 A * | 7/1972 | Weiss | 222/23 |
| 3,696,815 A | 10/1972 | Rowland-Hill et al. | 130/27 J |
| 3,792,709 A * | 2/1974 | Johnson et al. | 137/47 |
| 3,994,304 A | 11/1976 | Todd et al. | 130/27 T |
| 4,249,543 A | 2/1981 | Rowland-Hill | 130/27 T |
| RE31,257 E * | 5/1983 | Glaser et al. | 460/80 |
| 4,383,536 A * | 5/1983 | Delorme | 460/1 |
| 4,711,075 A | 12/1987 | Strong | 130/27 J |
| 4,998,904 A | 3/1991 | Kersting | 460/70 |
| 5,386,946 A | 2/1995 | Fetzer | 241/34 |
| 5,569,081 A * | 10/1996 | Baumgarten et al. | 460/112 |
| 6,152,820 A | 11/2000 | Heidjann et al. | 460/112 |
| 6,209,808 B1 * | 4/2001 | Anderson | 239/682 |
| 6,241,605 B1 | 6/2001 | Pfeiffer et al. | 460/69 |
| 6,331,142 B1 * | 12/2001 | Bischoff | 460/112 |
| 6,547,169 B1 * | 4/2003 | Matousek et al. | 239/661 |
| 6,656,038 B1 * | 12/2003 | Persson | 460/112 |
| 6,685,558 B2 * | 2/2004 | Niermann et al. | 460/111 |
| 6,729,953 B2 * | 5/2004 | Bueermann | 460/112 |
| 6,783,454 B2 | 8/2004 | Bueermann | 460/112 |
| 6,958,012 B2 | 10/2005 | Duquesne et al. | 460/76 |
| 2003/0114207 A1 * | 6/2003 | Wolters et al. | 460/111 |
| 2004/0029624 A1 * | 2/2004 | Weichholdt | 460/112 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

An adjustable deflector apparatus having a deflector plate for transitioning crop residue from the rotor of an axially arranged threshing system of a combine to a crop residue distribution system is disposed with the deflector plate pivotally mounted at approximately the height of the axis of the rotor at its downstream end to be movable into and out of the flow of the crop residue such that at least a portion of such flow will strike or impinge the deflector plate and be deflected thereby downwardly and transversely toward the crop residue distribution system. An adjusting mechanism is operable for moving the deflector plate in relation to an internal side of the combine for adjusting a desired parameter or parameters of the deflected flow and for moving the deflector plate to a retracted position when reverse operation of the rotor is desired.

31 Claims, 8 Drawing Sheets

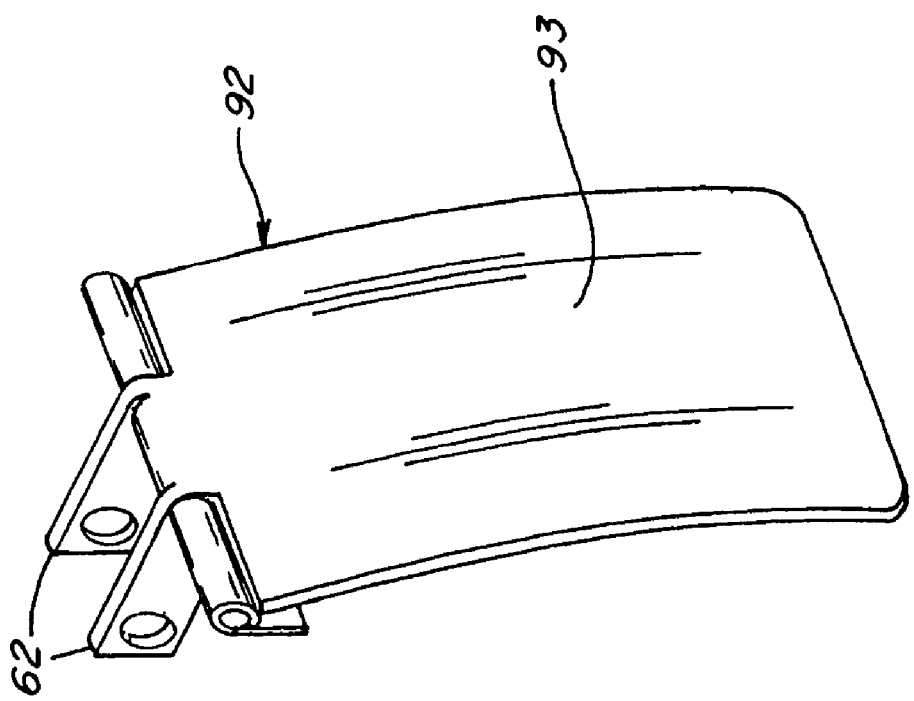
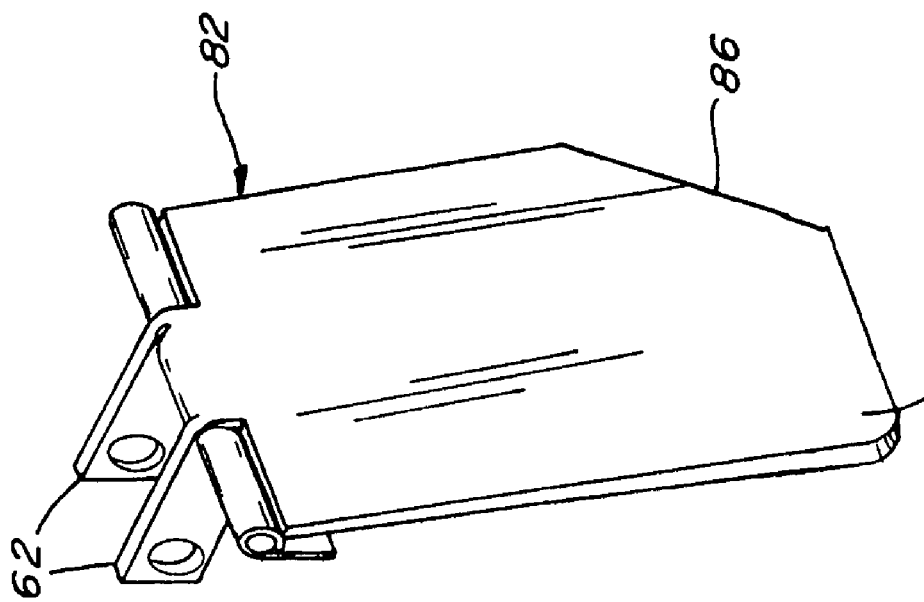

ADJUSTABLE AXIAL ROTOR DISCHARGE DEFLECTOR

TECHNICAL FIELD

This invention relates generally to an apparatus for transitioning or redirecting a flow of crop residue from an axially arranged threshing or separating system of an agricultural combine so as to flow more evenly into a crop residue distribution system for distributing the residue onto a field, and more particularly, to an apparatus including a crop residue flow deflector plate which is adjustably positionable within a range of positions so as to be impinged to a desired extent by a flow of crop residue from an axially extending rotor and concave assembly, for transitioning or deflecting the flow to the residue distribution system for achieving desired or required operational characteristics such as a particular transverse location, pattern and/or evenness of crop residue distribution on a harvested field, and to a method of operation thereof in the event of reverse rotor operation.

BACKGROUND ART

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a concave or cage, the rotor and surrounding concave being oriented so as to extend forwardly to rearwardly within the combine.

In operation, crop material is fed or directed into a circumferential passage between the rotor and the concave, hereinafter referred to as a rotor residue passage, and is carried rearwardly along a generally helical path in such passage by the rotation of the rotor as grain is threshed from the crop material. The flow of crop residue or MOG remaining between the rotor and concave after threshing is typically discharged or expelled by the rotating rotor at a rear or downstream end of the rotor and the rotor residue passage in a generally downward, or a downward and sidewardly, direction in what is a continuation of the helical path of movement of the crop residue within the rotor residue passage between the rotor and concave.

The flow is typically discharged into a discharge opening at the downstream end of the rotor and into a further passage, hereinafter referred to as a discharge passage, that extends downwardly and somewhat rearwardly into a crop residue distribution system located below and rearwardly of the rear end of the threshing system, and which typically includes a rotary beater or other apparatus which propels the crop residue rearwardly within a rear end of the combine for either discharge from the combine through a rear opening onto a field, or into a chopper and/or spreader mounted on the rear end operable for spreading the residue over a swath of a field.

Due to the nature of operation of the rotor, the design of the rotor and concave, and the helical movement of the crop residue within the rotor residue passage, the flow of crop residue from the rotor residue passage into the discharge opening is often greater on the downward sweep side of the rotor than on the upward sweep side, as a consequence of which an uneven flow of crop residue occurs across the width of the discharge opening, which uneven flow has typically, in the past, proceeded through the discharge passage to the crop residue distribution system.

When the crop residue is to be spread in a swath over a field, it is desirable in many instances for the crop residue to be distributed evenly or uniformly over the swath. This is desirable for reasons including that uneven crop residue distribution on a field can lead to temperature and moisture gradients detrimental to even growth of future crops on the field. It can also make it difficult for crops to utilize nutrients, and can impact the effectiveness of agricultural chemicals. Large discontinuities of crop residue can lead to plugging and other functional problems with tillage and/or planting equipment.

One factor which has been found to influence the ability of a chopper and/or spreader to distribute crop residue evenly or uniformly over a field is the transverse or side to side evenness of crop residue inflow into the chopper and/or spreader. That is, it has been found that the amount of crop residue infeed to one side of the chopper should be about equal to the amount of crop residue infeed to the other side in order to achieve even distribution over a field. In turn, the side to side infeed to the chopper/spreader has been found to be a function of the side to side distribution of crop residue infeed into the beater or other impeller of the crop residue distribution system from the threshing system.

Numerous devices and structures have been developed to improve flow of crop residue from axially arranged threshing systems into crop residue distribution systems, including constructions such as are disclosed in Payne et al. U.S. Pat. No. 6,352,474 entitled Metering Edge for Axially Arranged Rotary Separator and Pfeiffer et al. U.S. Pat. No. 6,241,605 entitled Discharge Geometry for Axially Arranged Rotary Separator.

Although the above referenced constructions may perform well, it has been found that a variety of variables and conditions can influence the ability to redirect and transversely distribute crop residue flow in the discharge passage between a threshing system and a crop residue distribution system. For example, residue from different crops, such as wheat and corn, will typically flow differently, and different rotor rotation speeds will typically be used for different crops. For instance, small grains such as wheat and other grasses will typically be threshed at a relatively high rotor speed, for instance, 600 to 1000 revolutions per minute (rpm), and produce residue containing a large volume of small stalks of straw, whereas corn will typically be threshed at a relatively slow rotor speed, for instance, less than 400 rpm, and produce crop residue containing a mixture of bulky stalk segments, cob fragments and large leaves. For a given crop, differences in plant maturity and weather conditions can affect size, moisture content, and other characteristics of crop residue so as to have varying flow and distribution characteristics.

Due at least in part to the above described variables and conditions, it has been observed that the transition of crop residue flow from the threshing system to the residue distribution system can vary. In particular, the side to side distribution of the flow into the rotating beater can vary, that is, flow to one side of the beater can be heavier than to the other side, such that the beater will propel more crop residue into one side of a chopper and/or spreader, resulting, in turn, in uneven crop residue distribution over a swath of a field.

In an attempt to address the foregoing problems, an apparatus was thus developed for transitioning crop residue from an axially arranged threshing system of a combine to a distribution system that overcomes one or more of the problems and disadvantages set forth above. Such apparatus, as described in co-pending U.S. patent application Ser. No. 11/204,230, includes an adjustable deflector construction that includes a movable portion, hereinafter referred to as a deflector plate, that can be adjustably positioned to be in the path of the flow of the crop residue when that residue is expelled from the threshing system and an adjusting mechanism operable for moving the deflector plate within the path of the flow of the crop residue for changing a transverse location at which the flow deflected by the deflector plate will flow into the crop residue distribution system. For the most part, prior to the present invention, deflector constructions have been positioned with the deflector plate hingedly or pivotally mounted at the downstream end of the rotor adjacent a lower quadrant of the rotor residue passage, and adjustment thereof has been performed either manually or under control of a control system.

It has now been discovered and recognized that improved performance and reliability can be achieved through the employment of additional features and methods, including by locating the deflector at a higher position at the downstream end of the rotor, with the hinge or pivoting axis for the deflector plate being at approximately the height of the axis of the rotor at its downstream end, and by also providing a control that will effect automatic retraction of the deflector to a nominal, safe, typically approximately vertical position, when a rotor reversing function is engaged, such as when the rotor has become plugged and actuation of a rotor reversing function or deplugging function is effected to clear the plug. By positioning the deflector plate in the discharge passage at the downstream end of the threshing rotor at such higher position at approximately the height of the axis of the threshing rotor at that downstream end, crop residue can be intercepted at an earlier and generally higher point of discharge and redirected as determined to be desirable to better distribute the crop residue, and especially to better direct a portion of the residue stream from the heavier flow side towards the lighter flow side of the spreader.

The noted, controlled retraction of the deflector plate prevents damage to the deflector apparatus by the crop residue and the rotor that might otherwise be occasioned by the change in the rotor's direction of rotation. In the absence of such controlled retraction, a rotor reversal can result in the forced deposit of crop residue between the backside of the extended deflector plate and the bulkhead to which it is mounted and the attendant risks of damage to both the deflector plate itself and to the adjustment means therefor as additional crop residue continues to be directed to such location. Even if the rotor reversal is only for a short duration, when the rotor operation is returned to its original condition, the buildup of crop residue between the backside of the deflector plate and the bulkhead to which it is mounted may be such that it does not properly clear, which can result in the deflector plate remaining in a jammed condition or in subsequent less effective operation and positioning of the deflector plate.

Additionally, it has been found that the inclusion of a projecting directional vane on the surface of the deflector plate and a tapered leading edge can both individually further assist in distributing the crop residue more evenly, and that it is also advantageous to be able to return the deflector plate to a desired, operating condition after the rotor reversing function has been completed or disengaged, such as the operating position prior to rotor reversal.

Consequently, there has now been developed an improved apparatus, and method of use thereof, for transitioning crop residue from an axially arranged threshing system of a combine to a distribution system that includes one or more of the features discussed hereinabove and which overcomes one or more of the problems and disadvantages set forth hereinabove.

SUMMARY OF THE INVENTION

What is disclosed is an adjustable axial rotor discharge deflector apparatus, and method of use thereof, for better transitioning crop residue from an axially arranged threshing system of a combine to a crop residue distribution system that overcomes one or more of the problems and disadvantages set forth hereinabove and which achieves the improved performance and reliability as also discussed hereinabove.

Such apparatus and method are especially useful with agricultural combines and like equipment, including combines which include an axially arranged threshing system having at least one rotor rotatable within a concave for moving crop residue along an internal rotor residue passage and discharging a flow of crop residue into and through a rearwardly located, generally downwardly facing discharge passage to a crop residue distribution system of the combine.

In accordance with one aspect of the invention, a deflector apparatus is disposed in a position in the discharge opening leading to a crop residue distribution system of the combine such that at least a portion of the downward crop residue flow will strike or impinge a deflector plate thereof and be deflected thereby transversely by a desired amount so as to extend in a desired manner through a more central region of the discharge passage toward the crop residue distribution system. In a preferred embodiment, such deflector apparatus includes a deflector plate having an upper end hingedly or pivotally mounted at or after the downstream end of the threshing rotor at an elevation approximately the same height as the axis of the rotor at its downstream end, and a free, depending portion extending therefrom and being rotatable about the hinge or pivot axis to be positionable within the path of the crop residue being discharged at the downstream end of the rotor. An associated adjusting mechanism is operable for moving the deflector plate in relation to the internal side of the combine for adjusting a desired parameter or parameters of the downwardly deflected flow, which can include, but are not limited to, a transverse location at which the flow will enter the crop residue distribution system. As a result, heavier inflow of crop residue into a side of the discharge opening can be intercepted at a more elevated position and transversely redirected so as to provide better side-to-side or transverse distribution of the crop residue flow through the discharge passage and into the crop residue distribution system. As a consequence, the crop residue distribution system will be better able to feed the crop residue more evenly into a chopper and/or spreader located on the rear end of the combine, resulting in more even and uniform distribution of the crop residue over a swath of a field from which the crop has been harvested.

The adjusting mechanism can be operated to move the deflector plate so as to direct more or less of the crop residue flow toward one of the sides of the crop residue distribution system, for feeding a corresponding greater or lesser amount of crop residue to a corresponding side of a chopper and/or spreader, and for correcting or compensating for conditions such as wind drift and the like.

In some embodiments, the adjusting mechanism can be operated to move the deflector in a first transverse direction for moving or shifting a location at which the flow deflected by the deflector will flow into the crop residue system in that same direction, and to also move the deflector in a second transverse direction opposite the first transverse direction for moving the location at which the flow deflected by the deflector will flow into the crop residue distribution system in the second transverse direction.

In certain preferred embodiments of the invention, the deflector plate may be configured such that a lower portion thereof extends downwardly from the upper portion to be positionable in the path of at least a portion of the crop residue flow and to include a lower or trailing edge positionable to extend into or across a path of the crop residue flow such that a portion of the flow above the lower edge will impinge or strike the face of the deflector plate and be deflected downwardly thereby into a portion of the flow below the lower or trailing edge for deflecting the lower flow downwardly in a desired manner into the crop residue distribution system. The deflector plate may assume any of numerous configurations and shapes, including, but not limited to, a generally flat shape, a curved shape such as a concave or convex curved shape, a wedge or like shape, or a conical or other shape, as desired or required for a particular application. Additionally, the lower or trailing edge of the deflector plate may optionally be straight or have an irregular shape, such as a beveled shape, stepped shape, serrated shape, or a curved shape, such as a concave curved shape, or a convex curved shape, as desired or required.

In some preferred embodiments, the leading edge of the deflector plate may be tapered in order to secure and facilitate a more uniform flow of crop residue in the discharge passage. The heavier or greater flow being expelled from the rotor residue passage near the concave surface on the downward swept side of the rotor can be more fully intercepted and redirected by a broader portion of the face of the deflector plate nearer the upper portion of the deflector plate while the relatively lighter flow being expelled closer to the axis of the rotor near the rotor surface will be subject to less redirection due to the tapering of the leading edge and the narrower portion of the face of the deflector plate at the face end of the deflector plate. Such tapering allows for improved uniformity of flow through the discharge passage.

In one of such preferred embodiments, the face of the lower portion of such deflector plate may also include an outwardly projecting directional vane disposed thereon for intercepting a portion of the flow of crop residue across the face of the deflector plate and redirecting that flow in a desired manner into the crop residue distribution system. Such vane, especially in conjunction with the interception of a portion of the flow of crop residue at a greater elevation above the crop residue distribution system as it is being discharged from a side of the rotor residue passage into the discharge passage and to a crop residue distribution system of the combine, affords better control of the crop residue flow to achieve a more uniform distribution of the crop residue to the crop residue distribution system.

To facilitate the redistribution of the crop residue, the adjusting mechanism of the deflector apparatus can comprise a remotely controllable actuator, such as, but not limited to, a fluid cylinder, rotary or linear actuator, dashpot, solenoid, or other well known, commercially available actuator device, which can be controllable by a switch or other operator control, or an automatic control, such as a processor based control system, for achieving one or more desired crop residue flow characteristics.

In the operation of such adjusting mechanism, the deflector plate can be selectively moved between various positions, including, for example, a position close to the interior side of the combine so as to have little or no effect on the flow, and a range of other positions extending to a desired extent into and at a desired orientation in relation to all or a portion of the crop residue flow for achieving a desired redirecting effect on the flow. For purposes of further discussion herein, the position close to the interior side of the combine so as to have little or no effect on the flow will be referred to as a retracted position and other positions in which the deflector plate projects into a portion of the crop residue flow for achieving a desired redirecting effect on the flow will be referred to as extended positions.

In accordance with a further aspect of the invention, the adjusting mechanism is operable when rotor reversal is desired or required, such as to deplug the rotor, to move the deflector plate to a retracted position in order to minimize the risk of damage to the deflector apparatus during the reverse or deplugging operation of the rotor. Preferably, depending upon the nature of the deflector utilized and its operational details, including the structure and operation of the adjusting mechanism therefor, operational status information, including information representative of a desired extended position of the deflector plate, such as the position of the deflector plate prior to the commencement of the rotor reversal function, will be maintained or saved, and, upon completion of the rotor reversal function, the deflector plate will be returned from its retracted position to a desired, extended position, such as the prior extended, operational position of the deflector plate.

BRIEF DESCRIPTION OF THE DRAWINGS

FIG. 12 is a perspective view of an embodiment of a deflector plate that has a partially tapered trailing edge.

FIG. 13 is a perspective view of another alternative deflector plate that has a curved shape.

DETAILED DESCRIPTION OF THE INVENTION

Figure 1:
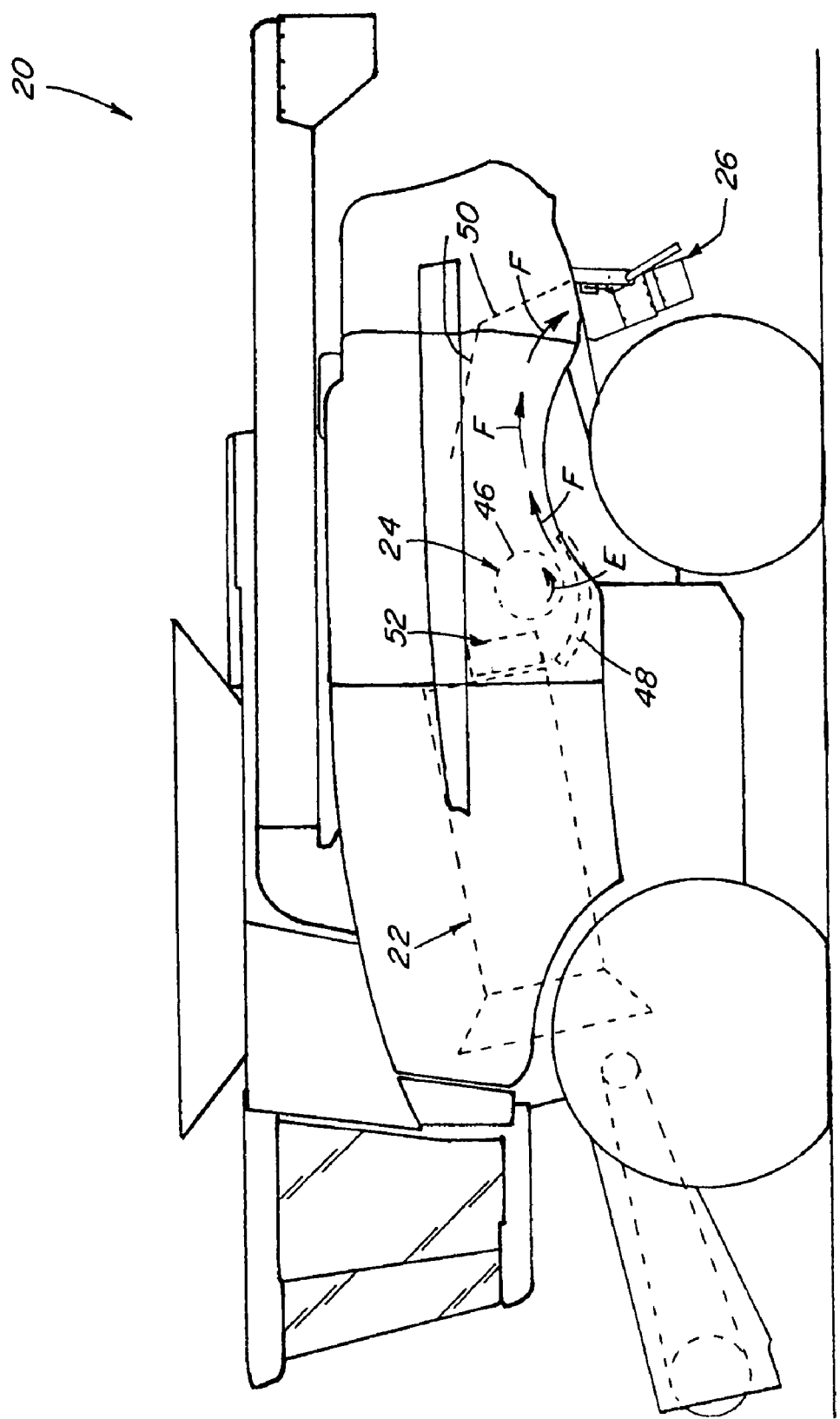
FIG. 1 is simplified schematic side view of agricultural combine, illustrating in dotted lines an axially arranged threshing system of the combine, and an adjustable deflector apparatus of the invention for transitioning crop residue flow from the threshing system to a residue distribution system of the combine.

Referring now to the drawings, wherein preferred embodiments of the present invention are shown and wherein like numerals refer to like items, FIG. 1 depicts a representative agricultural combine 20 that includes an axially arranged threshing system 22, a crop residue distribution system 24, and a crop residue chopper/spreader 26, all of well known construction and operation.

Figure 2:
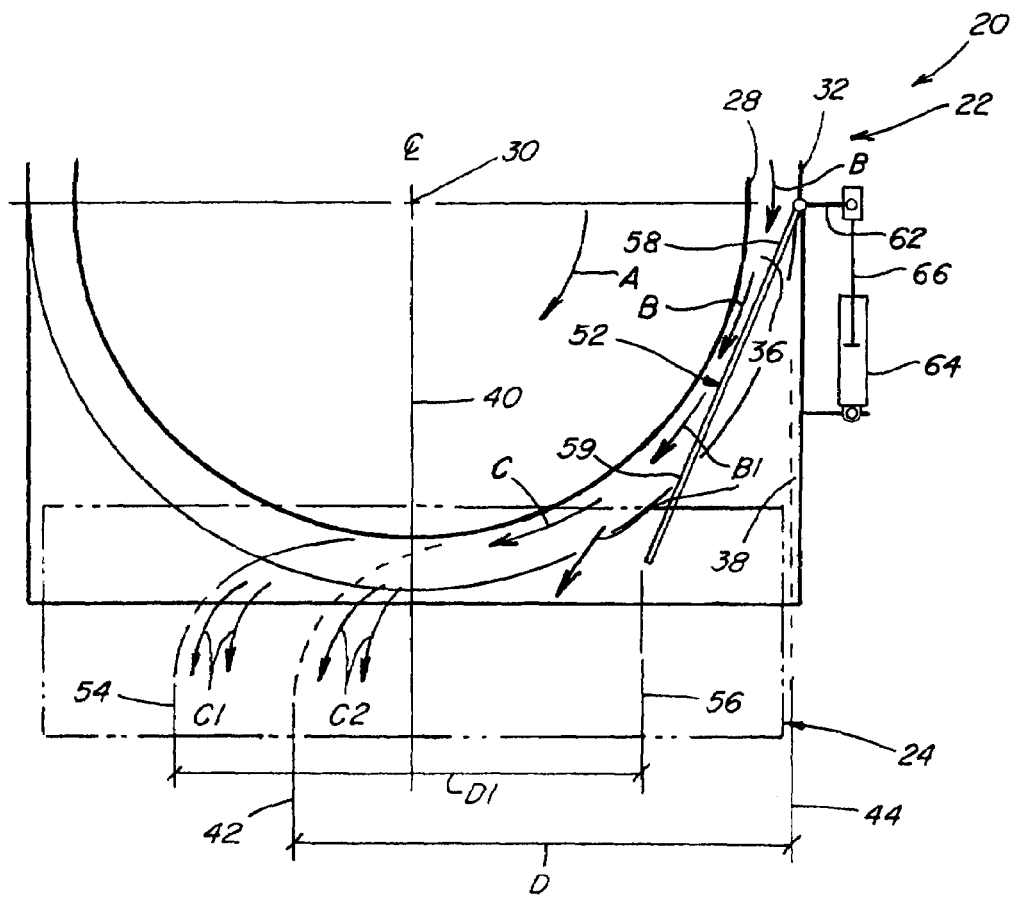
FIG. 2 is a simplified schematic rear view of the combine of FIG. 1, showing the threshing system and deflector apparatus of the invention, and illustrating in phantom a path of crop residue flow expelled from the threshing system, and an adjusted path of the flow as effected by the deflector plate of the invention.
Figure 5:
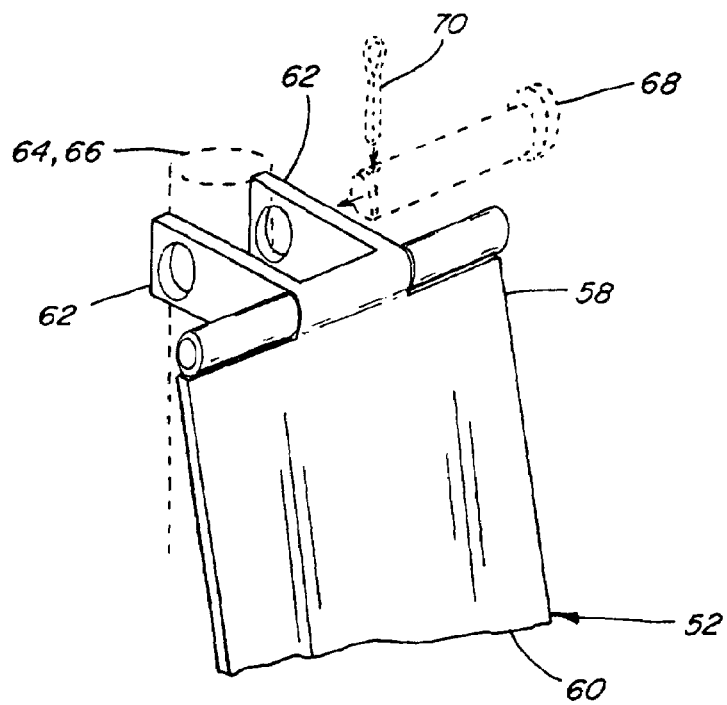
FIG. 5 is a fragmentary perspective view of one embodiment of a deflector plate of the invention, illustrating connection thereof with an actuator operable for adjustably moving the deflector plate.

As can be generally and essentially observed from a review and study of FIGS. 1-4, threshing system 22 is axially arranged in that it includes a cylindrical rotor 28 conventionally supported and rotatable in a predetermined direction, with arrow A in FIG. 2 denoting a typical clockwise, or forward, rotation, about a rotational axis 30 therethrough and within a concave 32, for conveying a flow of crop material in a helical flow path through a space 34 extending circumferentially around an outer cylindrical surface 35 of rotor 28 and an inner circumferential surface of concave 32. As the crop material is moved through space 34, the crop, such as grain, legumes, or the like, will be loosened and separated from crop residue such as husk and pods, and carried away therefrom in the well known conventional manner.

Figure 4:
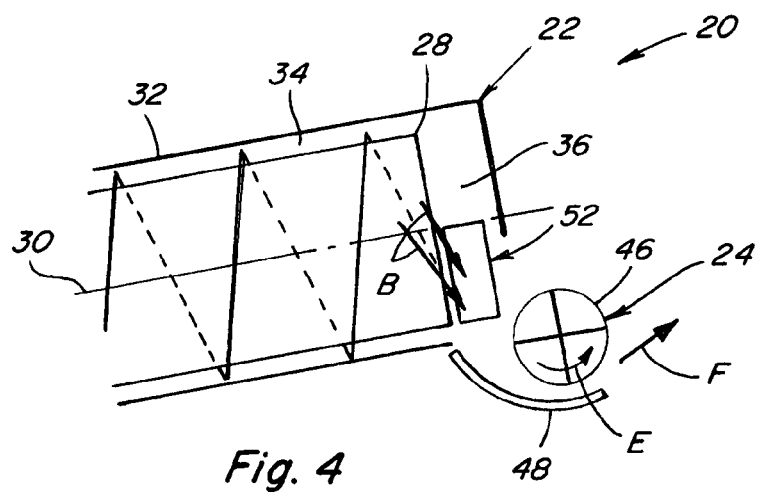
FIG. 4 is a simplified schematic side view of the threshing system, deflector plate of the invention, and crop residue distribution system.
Figures 6, 7:
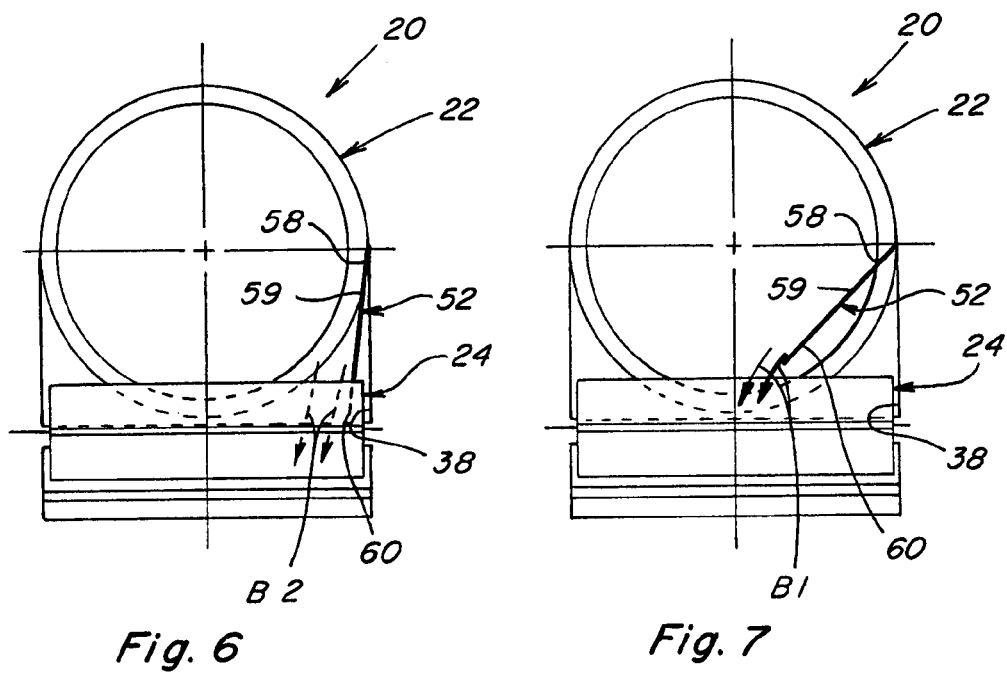
FIG. 6 is a simplified schematic rear view of the threshing system, deflector of the invention, and residue distribution system, showing the deflector plate in a minimally extended position beside a side of the combine.
FIG. 7 is another simplified schematic rear end view of the threshing system, deflector plate and residue distribution system, showing the deflector plate at an alternative, extended position in relation to the side of the combine.

As may be best illustrated by FIG. 4, the crop residue will continue along a helical path through space 34, and will be expelled therefrom, as denoted by arrows B, into and through a discharge opening 36, which essentially comprises an extension of space 34 at the downstream end of rotor 28. Some of the flow expelled through discharge opening 36 will tend to be directed more downwardly, as denoted by arrow B on the right hand side of FIG. 2, so as to flow generally downwardly along internal side 38, while some portions of the flow will be directed and/or be carried by rotating rotor 28 and momentum, in a transverse direction, denoted by arrow C in FIG. 2, toward an opposite internal side of combine 20, and will eventually flow downwardly toward crop residue distribution system 24, as denoted by arrows C1.

The consistency of the flow of crop residue, volume thereof, and extent or pattern thereof, will typically vary, and be a function of a variety of conditions, including, but not limited to, a speed of rotation in direction A of rotor 28, crop type, plant maturity, moisture content, and weather conditions. As an example, rotor speeds can vary between just a few hundred rpm and over a thousand rpm. Wheat and other small grains will typically have relatively small crop residue components, whereas other grains, such as corn, will typically have larger components, such as thick stalk segments, cob fragments, and large leaves. Typically, as observable in FIG. 2, the downward flow of crop residue will be more to a right hand side of a front-to-rear extending vertical centerline 40 of both threshing system 22 and crop residue distribution system 24. The sideward extent of such typical downward flow is represented by extent D in FIG. 2, and is generally bounded on the left hand side by a line 42 extending generally downwardly on the left of centerline 40, and on the right hand side by a line 44 extending generally downwardly from internal side 38, the sideward or transverse location of line 42 and thus the transverse extent D of the downward flow varying as a function of one or more of the above conditions and/or parameters.

Here, it should be noted that crop residue distribution system 24 will typically include a rotary device, such as a beater 46 (see FIG. 4), rotatable in a direction E above a concave pan 48. Beater 46 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow into a crop residue chopper and/or spreader, such as chopper/spreader 26, or through a rear opening so as to be deposited directly onto a field.

Typically, a chopper and/or spreader, such as a chopper/spreader 26 will be operated so as to distribute the crop residue in a layer on a swath of a field being harvested by combine 20. As noted hereinabove, it is often desirable for the crop residue to be distributed evenly or uniformly over the swath, for a variety of purposes, important among which is uniform emergence of subsequently planted crops, and uniform application of chemicals and fertilizers onto the field.

As has also been noted hereinabove, it has previously been noted that heavier flow of crop residue into one side or the other of crop residue distribution system 24 will result in that system propelling more crop residue toward a corresponding side of a spreader apparatus, such as chopper/spreader 26, with a result of a heavier layer or distribution of crop residue on a corresponding side of a swath over a field. For the reasons set forth above, such uneven deposition of crop residue on a field is undesirable in many instances.

With reference now, also, to FIGS. 5-8, the present invention, which has been developed to overcome this problem and to provide the ability to adjust the side-to-side or transverse extent and location of crop residue flow into the crop residue distribution system of a combine, such as system 24 of combine 20, resides in a deflector apparatus that includes an adjustable deflector plate 52 disposed to be adjustably movable into and out of the path of at least a portion of the crop residue flow B. More particularly, deflector plate 52 is preferably located in a position such that, when it is positioned extending into the path of crop residue flow B, at least portions of that crop residue flow which would flow along or close to side 38, will instead impinge or strike deflector plate 52 and be deflected downwardly thereby, as denoted by arrow B1 in FIGS. 2 and 7, and arrows B2 in FIG. 6.

Importantly, the downwardly directed crop residue flow, as illustrated by representative arrows B1 and B2, will be transversely shifted or moved in a transverse direction in the discharge opening, that is, more to the left of internal side 38 in such figures, depending on the transverse position and orientation of deflector plate 52. Here, comparing FIG. 6 to FIGS. 2, 3, and 7, it is apparent that the farther deflector plate 52 is moved or extended transversely away from side 38, the farther the downwardly directed crop residue flow is shifted in the transverse direction.

Addressing FIG. 2 more particularly, it should be noted and understood that the transverse movement or shifting of downwardly directed flow B1 causes a corresponding transverse shift of other portions of the downwardly directed flow in the transverse direction, as illustrated by arrows C1. Thus, it has been found that the overall transverse extent of the downward flow of crop residue, denoted by extent D1, extending between lines 54 and 56, can be transversely moved or shifted by deployment of a deflector, such as deflector plate 52, in the path of portions of flow B in the vicinity of internal side 38 of the combine.

Thus, for a combine including a crop residue distribution system, such as system 24 including a rotary beater 46, the transverse position or location of crop residue inflow can be adjusted, for example, to be better aligned with a vertical centerline of the distribution system, such as centerline 40, which is a joint centerline of rotor 28 of threshing system 22 and beater 46 of distribution system 24, as illustrated by the location of the center of transverse extent D1 in FIG. 2.

Figure 3:
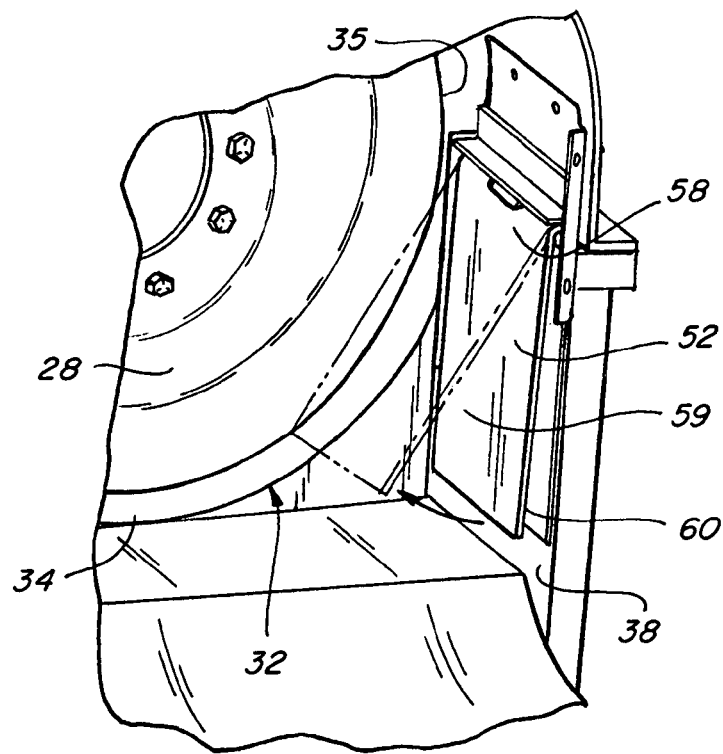
FIG. 3 is a rear perspective view of a portion of a representative combine showing in better detail certain of the components depicted in FIG. 2, with the deflector plate being shown in a retracted position and illustrating in phantom the deflector plate in an extended position.

As viewed in FIGS. 2 and 3, in its normal, forward operation rotor 28 is rotated in a clockwise direction, making the right side of concave 32 the downward swept side and the left hand side of concave 32 the upward swept side. Deflector plate 52 is shown being pivotally mounted within the discharge opening 36 at the downstream end of rotor 28 at approximately the level of the axis 30 of rotor 28 at its downstream end and adjusted to extend into the flow of crop residue to intercept at least a portion of the crop residue as the crop residue is helically expelled from the upper portion of rotor residue passage 34 on the downward swept side of rotor 28 and to meter the intercepted flow to crop residue distribution system 24.

To enable effecting adjusting movements of deflector apparatus 52 for such purposes as effecting a transverse shift in overall crop residue flow, deflector plate 52 is preferably pivotally or hingedly mounted to combine 20 for pivotal movement through a range of positions, such as represented by the positions shown in FIGS. 2, 3, 6 and 7. Deflector plate 52 is preferably constructed of a rigid, abrasion resistant material, such as sheet metal or the like, and includes an upper end portion 58 mounted at a suitable location, such as on internal side 38 as best shown in FIGS. 2 and 3.

Deflector plate 52 additionally includes a lower end portion 60 which extends downwardly from upper end portion 58 and may be extendably positioned in the path of at least a portion of the flow B of crop residue, so that face 59 may be impinged or struck by the flow B for deflecting it downwardly in the above-described manner. To facilitate pivotal movement of deflector plate 52 relative to internal side 38, upper end portion 58 may include a pair of pivot arms 62 which extend through appropriate passages in internal side 38 and pivotally connect with an actuator 64 operable for effecting pivotal movement of deflector plate 52 through a range of positions between about those shown in FIGS. 6 and 7.

Actuator 64 is preferably located external to threshing system 22 so as to be outside of the path of the crop residue flow. Actuator 64 can be any suitable commercially available actuator device and is preferably remotely controllable, such as by use of a switch or other control in an operator cab of combine 20, or it can be controlled automatically, such as by a processor based controller or the like (not shown), for effecting desired pivotal movements of deflector plate 52. Actuator 64 can comprise any suitable actuator device, such as a fluid cylinder, a linear actuator, such as a dashpot or solenoid, a rotary actuator, or the like, operable for effecting the desired movements. Here, actuator 64 is depicted as a fluid cylinder including a rod 66 having an end pivotally connected to pivot arms 62 in a suitable manner, such as using a pin 68 (FIG. 5) which can be extended through aligned holes in pivot arms 62 and rod 66, and secured therein in a suitable manner, such as by use of a cotter pin 70, in the well known manner.

Figure 8:
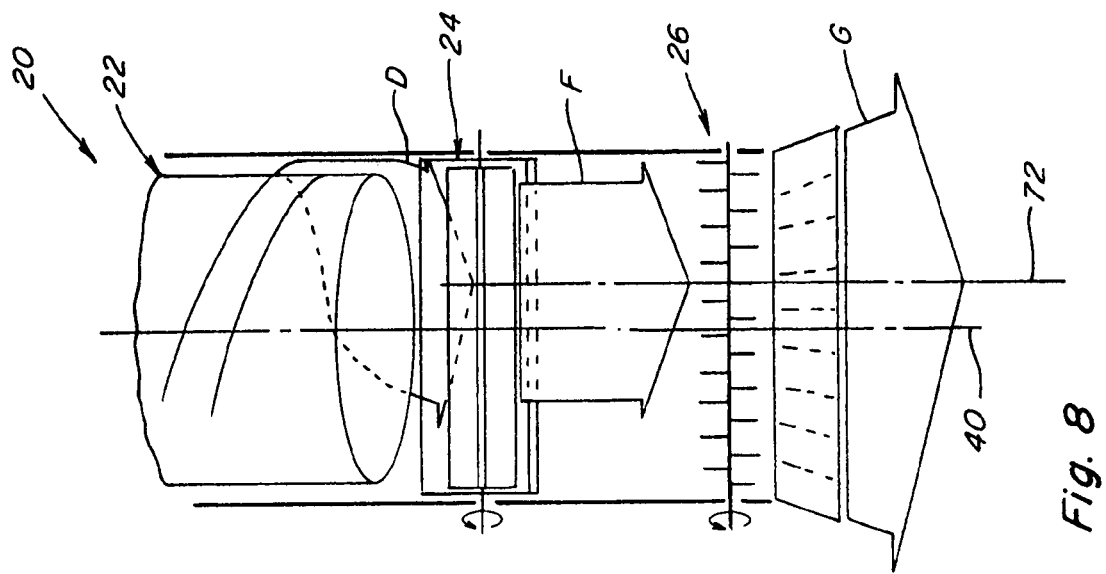
FIG. 8 is a simplified schematic top view of a rear end of the combine, showing the threshing system, crop residue distribution system, and a crop residue chopper/spreader apparatus of the combine, and illustrating crop residue flow through the rear end of the combine and a relationship of crop residue discharged from the combine in relation to an axial centerline thereof.

Referring now to FIG. 8, such figure generally depicts typical crop residue flow characteristics that have previously been encountered with flow from an axially arranged threshing system 22 of a combine 20 into a crop residue distribution system 24, and from there, into and from a crop residue chopper/spreader 26. It can be observed in such figure that flow D from threshing system 22 is centered about a centerline 72 which is offset from centerline 40 of threshing system 22. With such configuration, the crop residue flow F that is propelled rearwardly by crop residue distribution system 24 is similarly offset in the same direction and centered about centerline 72. Flow F flows into crop residue chopper/spreader 26 in the offset manner, and chopper/spreader 26, in turn, propels the crop residue from the rear end of combine 20 in a similarly offset manner, as illustrated by large arrow G. As a result, the crop residue is spread unevenly over a swath of the field.

Figure 9:
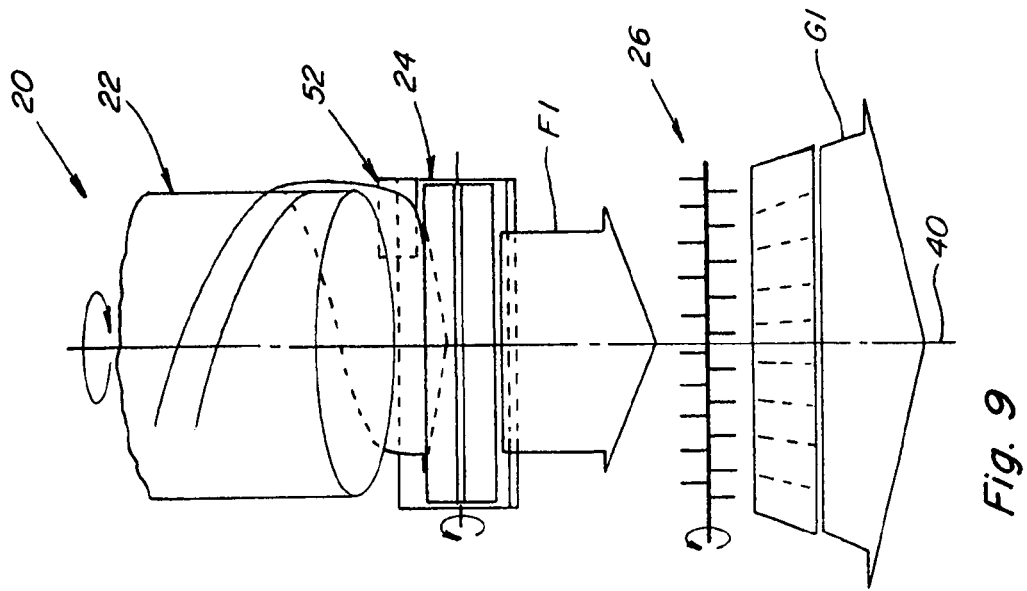
FIG. 9 is another simplified schematic top view of the combine, showing the threshing system, deflector plate of the invention, residue distribution system and chopper/spreader apparatus, illustrating alignment of crop residue flow with an axial centerline as the result of the present invention.

In contrast, as depicted in FIG. 9, utilization of the present invention, including adjustable deflector plate 52, in association with threshing system 22 of combine 20, results in a deflection of crop residue flow D1 into crop residue distribution system 24 in a more centered manner, and the consequent, more centered discharge of crop residue from distribution system 22 relative to centerline 40, as is illustrated by the location of the center of arrow F1. The crop residue flow is therefore inducted into chopper/spreader 26 in a more centered manner, and so as to be propelled from the rear end of combine 20 in a more centered relationship to centerline 40, as illustrated by arrow G1.

Figure 10:
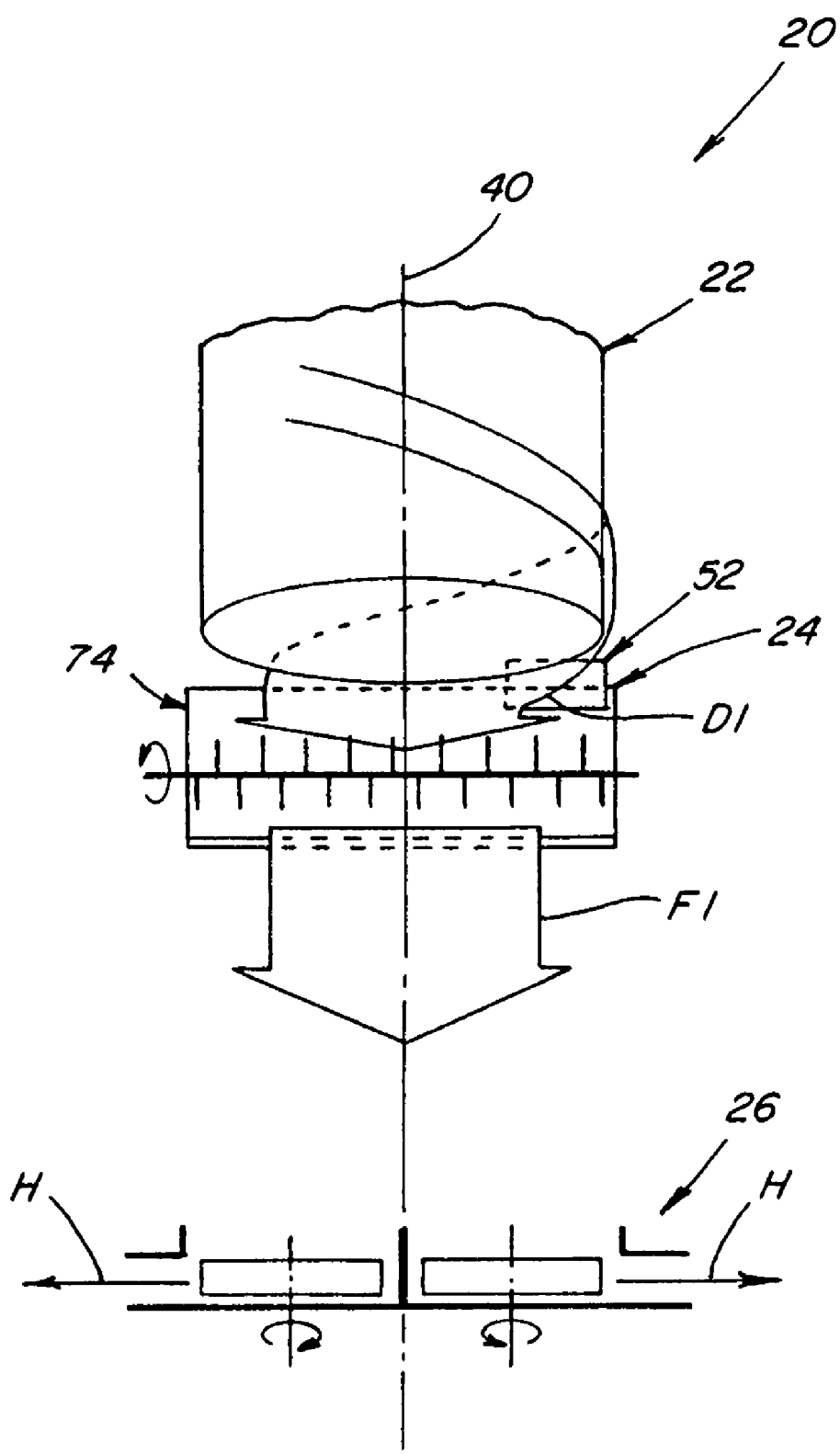
FIG. 10 is still another simplified schematic top view of the combine, showing the threshing system, deflector apparatus of the invention, and an alternative residue distribution system and spreader apparatus, illustrating alignment of crop residue flow with an axial centerline of the combine resulting from the present invention.

As depicted in FIG. 10, combine 20 includes axially arranged threshing system 22 and adjustable deflector plate 52, as discussed hereinabove, but differs therefrom in that it illustrates the utility of adjustable deflector plate 52 in association with a crop residue distribution system 24 that includes a rotary chopper 74 instead of beater 46. The effect is much the same in that the shift of the infeed of crop residue flow as effected by deflector plate 52 is illustrated by arrow D1, centered about centerline 40, such that discharge from distribution system 24 is also centered along centerline 40, as illustrated by arrow F1.

In FIG. 10, a different embodiment of a crop residue chopper/spreader 26 is illustrated, including a pair of impellers rotatable about horizontal axes for discharging crop residue in opposite sideward directions, as illustrated by arrows H. Again, the centered flow of crop residue F1 from distribution system 24 and into chopper/spreader 26, results in more even inflow into chopper/spreader 26, such that outflows H will be more even, resulting in more uniform spreading characteristics.

Figure 11:
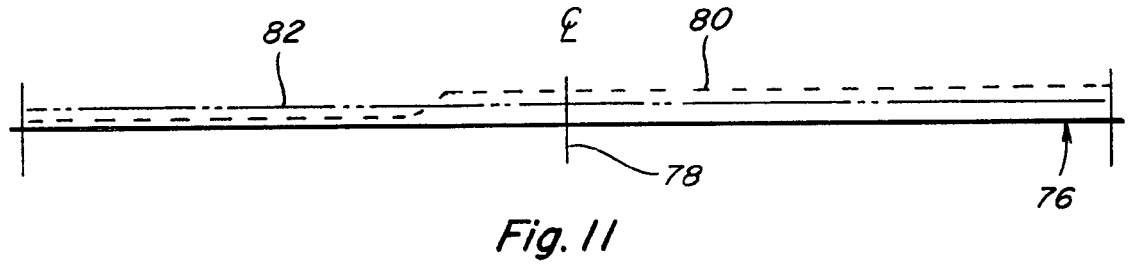
FIG. 11 is a simplified schematic representation of a swath of a field, showing in dotted lines a representative pattern of crop residue distribution over the swath without the invention, and in phantom a pattern of crop residue distribution over the swath as effected by the deflector apparatus of the invention.

Referring also to FIG. 11, a representative swath 76 of a field is shown, including a centerline 78 which will correspond in location to centerline 40 of combine 20 illustrated in the above figures. A representative distribution of crop residue without use of adjustable deflector apparatus 52 is shown by hidden line 80, and illustrates a heavier distribution of crop residue to the right hand side of centerline 78. Phantom line 82 is level and even across the extent of swath 76, and illustrates an even, uniform distribution of crop residue over a swath, such as a swath 76, utilizing the present invention, including deflector plate 52 in the above-described manner.

FIGS. 12 and 13 illustrate alternative embodiments of adjustable deflector plates. In FIG. 12, deflector plate 82 includes an alternative free end portion 84 including a tapered lower or trailing edge portion 86. In FIG. 13, deflector plate 92 is shown including a curved surface 93. These alternative embodiments illustrate the adaptability of the deflector apparatus of the present invention for achieving a variety of crop residue flow characteristics that may be desired or required for a particular application.

Figure 14:
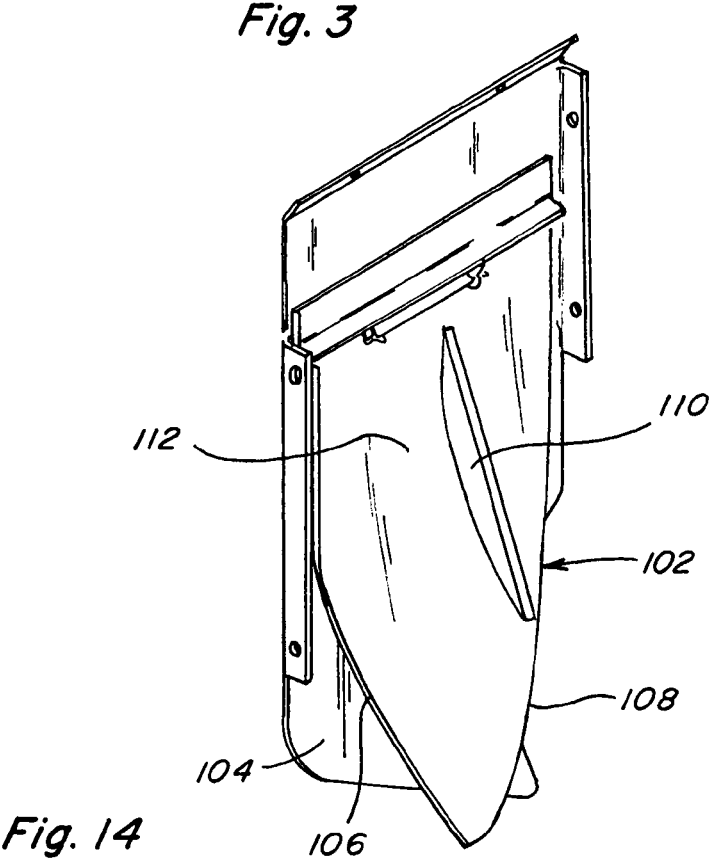
FIG. 14 is a perspective view of a different preferred deflector plate of the invention, including a directional vane on the face thereof.

FIG. 14 depicts a preferred deflector plate embodiment 102 which is hingedly connected at its upper end to a mounting plate 104 that can be mounted within the discharge opening by any well known conventional manner to internal side 38 in a location such as is depicted in FIGS. 2 and 3. Deflector plate 102 has a tapered leading edge 106, which secures and facilitate a more uniform flow of crop residue in the discharge passage, as well as a tapered trailing edge 108, and also includes a projecting directional vane 110 on the face 112 of the deflector plate for intercepting a portion of the flow of crop residue across the face of the deflector plate and redirecting that flow in a desired manner into the crop residue distribution system, as has been addressed hereinbefore.

Figure 15:
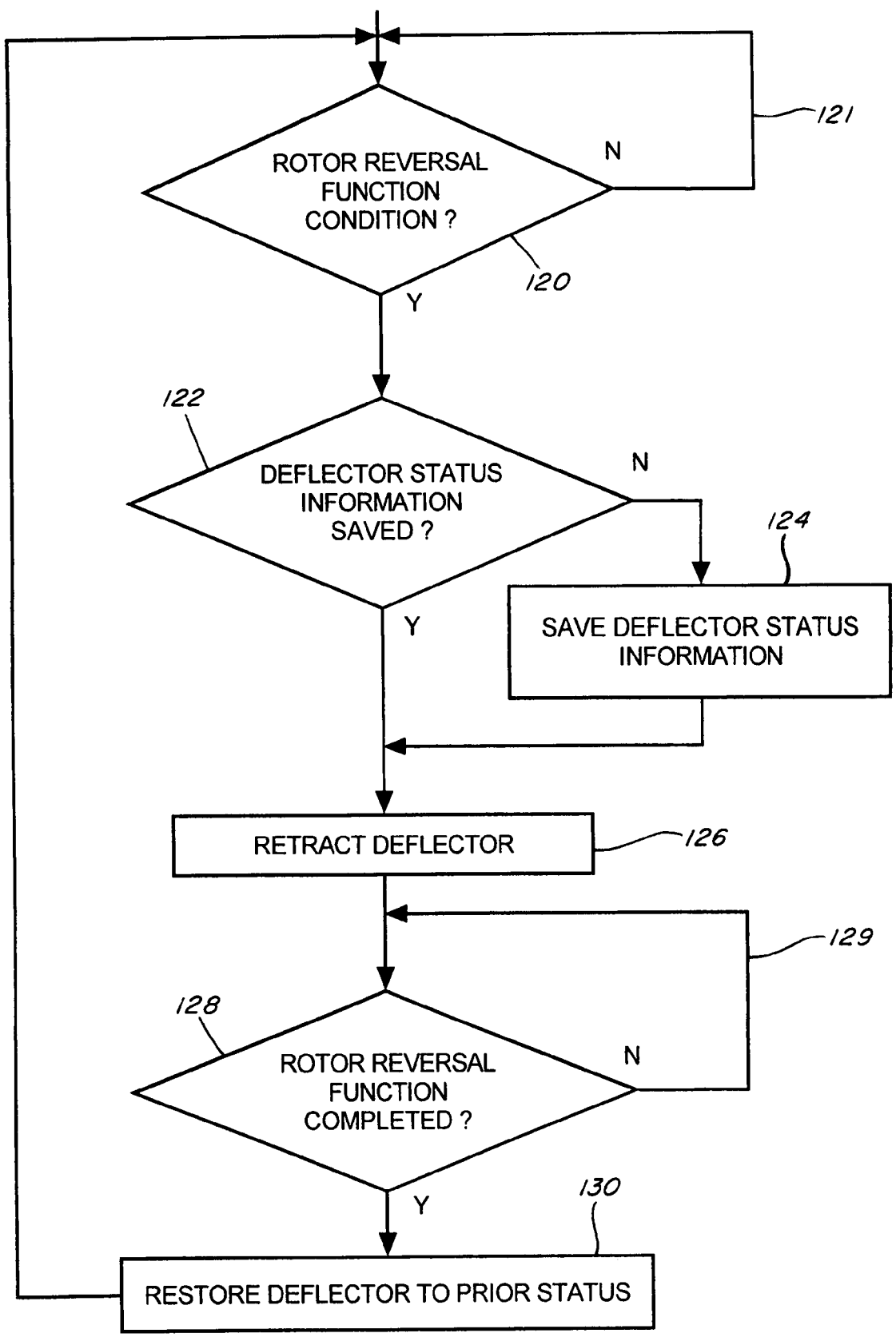
FIG. 15 is a generalized flowchart depicting a preferred method of operation of the deflector apparatus when a rotor reversal function is required or desired.

FIG. 15 depicts a generalized flowchart showing a preferred method of operation of the deflector apparatus when a rotor reversal function is required or desired, especially as such method may be effected in a programmed, processor based control system to effect operation of the deflector plate when a rotor reversal function condition exists. As has previously been noted, it is sometimes the case that reversal of the rotor is found to be necessary or desirable such as to deplug the rotor. In such instances, retraction of the deflector plate to a retracted position is desirable in order to minimize the risk of damage to the deflector apparatus during the reverse or deplugging operation of the rotor. In general, the accomplishment of such action requires determining, during a forward operation of the rotor, that reversal of rotor operation is desired, and effecting operation of the adjusting mechanism to retract the deflector plate to a retracted position generally out of the path of the crop residue during the reverse operation of the rotor. Preferably, especially when automated controls are utilized, it is advantageous to also be able to return the deflector plate, upon the completion of the rotor reversal function, to the position that it had been in prior to its retraction.

In accordance with the preferred method of FIG. 15, a check is made, such as at block 120, to determine whether a rotor reversal function condition exists. Such condition could arise due to actions of an operator, such as by operation of an operator control, or information maintained or developed by or in the operation of an automated control system, including as a result of information provided by a monitor or like device. Until and unless a rotor reversal function condition is determined to exist, no action relative to retraction of the deflector plate need be taken, as is illustrated by the loop connector 121 from the N or "NO" output of block 120 back to the input to block 120. However, if a rotor reversal function condition arises, as is depicted by the Y or "YES" output of block 120, a check is then preferably made, such as at block 122, to determine if deflector status information has been saved or retained, such as including the then-operational position of the deflector plate. If not, as is indicated by the N or "NO" output of block 122, such deflector status information is saved, as is denoted by block 124.

If, at block 122, the deflector status information has already been saved, as is indicated by the Y or "YES" output of block 122, or upon completion of the saving of such information at block 124, action to retract the deflector plate can then be effected, as at block 126.

Depending upon particular designs and configurations employed and the control systems utilized, action to retract the deflector plate may be a pre-condition for the actual rotor reversal function or the rotor reversal function may be effected independently of the various steps depicted in FIG. 15, and the actions of blocks 122 and 124 need not necessarily be included in order to effect the retraction of the deflector plate in accordance with the broader aspects of the present invention. Preferably, however, actions such as those of blocks 122 and 124 will be performed since saved deflector status information can subsequently be advantageously utilized to return the deflector plate to a desired position, such as its prior operational state, once the rotor reversal function has been completed.

In such an event, following retraction of the deflector plate and completion of the rotor reversal function, when the rotor is returned to operation in its normal, forward direction, the deflector plate will then preferably be restored to such desired position, such as the position that it had prior to determination that a rotor reversal condition existed. In FIG. 15, such operation is depicted by blocks 128 and 130. A check is made to determine if the rotor reversal function has been completed, such as at block 128. Until and unless it is determined that the rotor reversal function has been completed, no action relative to restoration of the deflector plate to the desired position need be taken, as is illustrated by the loop connector 129 from the N or "NO" output of block 128 back to the input to block 128. When it is determined that the rotor reversal function has been completed, as is depicted by the Y or "YES" output of block 128, action to restore the deflector plate to its previous operational state or other desired position can then be effected, as at block 130.

Once restoration of the deflector plate to its prior status or to another desired position occurs, combine operation, at least so far as adjustment of the deflector plate is concerned, can continue essentially as it was, and checks can thereafter again be made, as at block 120 at the beginning of the operation sequence as described hereinabove, to determine if a subsequent rotor reversal condition arises.

Depending upon particular systems and constructions employed, as well as the particularities associated with any rotor reversal function, including whether additional operations or actions may be associated with any given rotor reversal operation, completion of the rotor reversal function may be determined or determinable in various ways, including, by way of example and not of limitation, the actuation of a switch or control by the combine operator, the occurrence of a given combine function, such as the return of the given combine function to its previous, pre-rotor-reversal operating state or condition, or detection that a given, monitored attribute or condition associated with the combine or the rotor thereof, such as the rotor speed, has reached or attained a given status. For example, in accordance with one contemplated embodiment, the rotor reversal function would be considered completed when the rotor speed (RPM) is determined to have returned to approximately 80% or more of the speed of the rotor prior to rotor reversal. As is illustrated by FIG. 15, once a determination has been made that the rotor reversal function of a particular system and construction has been completed, restoration of the deflector plate to its prior operational state would then be effected.

It should be noted that, although the foregoing discussion has addressed returning the deflector plate to the operational state that it was in prior to the rotor reversal function, in some instances and under some circumstances it may be desired to position the deflector plate in some other position or state, such as a default or other desired position, following the completion of a rotor reversal function. Consequently, for purposes of this document and the discussions herein, any references to and discussions regarding the restoration or return of the deflector plate to a prior position should also be considered to include the positioning of the deflector plate in a default or other desired position, which position may be represented or determined by pre-stored information or by certain information saved as at block 124 of FIG. 15, which information may not necessarily be representative of the state of the deflector plate prior to the rotor reversal function.

It will be apparent to those skilled in the art, upon a reading of this disclosure, that, within the principles and scope of the invention, many changes are possible and contemplated in the details, materials, steps, and arrangements of parts which have been described and illustrated to explain the nature of the invention. The foregoing description illustrates a preferred embodiment of the invention; however, concepts, as based upon the description, may be employed in other embodiments without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. Apparatus for adjustably transitioning a flow of crop residue being expelled into a discharge opening at the downstream end of a rotor of an axially arranged threshing system of an agricultural combine so as to flow into a crop residue distribution system of the combine, comprising:

a deflector construction including a deflector plate and an adjusting mechanism operable for moving the deflector plate, said deflector construction mounted in the discharge opening, said deflector plate having a pivotal mounting located at approximately the height of the axis of the rotor at the downstream end of the rotor and supported thereat so as to be adjustably movable into and out of the path of the flow of crop residue when the crop residue is being expelled into the discharge opening such that, when said deflector plate is positioned in the path of the flow of the crop residue, at least a portion of the flow will impinge the deflector plate and be deflected thereby downwardly into the crop residue distribution system, said adjusting mechanism operable to controllably move said deflector plate into and out of the path of the flow of the crop residue for changing a transverse location at which the flow deflected by the deflector plate will flow into the crop residue distribution system, wherein said adjusting mechanism is operable for moving the deflector plate in a first transverse direction within the discharge opening for moving the location at which the flow deflected by said deflector plate will flow into the crop residue distribution system in the first transverse direction, and is further operable for moving said deflector plate in a second transverse direction within the discharge opening for moving the location at which the flow deflected by the deflector plate will flow into the crop residue distribution system in the second transverse direction, wherein said deflector plate includes an upper portion and a lower portion, said upper portion being pivotally mounted in the combine such that at least said lower portion is movable between a retracted position generally out of the path of flow of the crop residue and at least one other extended position located in the path of the flow, and further wherein said adjusting mechanism is operable to effect retraction of said detector plate to said retracted position when the rotor is caused to rotate in reverse mode.

2. The apparatus of claim 1 wherein said lower portion of said deflector plate includes a tapered leading edge.

3. The apparatus of claim 1 wherein said lower portion of the deflector plate includes a face having a projecting vane thereon, said vane directing at least a portion of the flow of crop residue impinging said face.

4. The apparatus of claim 1 wherein said adjusting mechanism is operable, upon completion of operation of the rotor in reverse mode, to effect a return of said deflector plate to a desired extended position.

5. The apparatus of claim 4 wherein said desired extended position is the adjustment position said deflector plate was in prior to its retraction when the rotor was caused to operate in reverse mode.

6. The apparatus of claim 4 wherein said adjusting mechanism comprises a remotely controllable actuator.

7. The apparatus of claim 4 further including a control system operable to store information representative of a desired extended position of said deflector plate, said control system operable, upon completion of operation of the rotor in reverse mode, to effect operation of the adjusting mechanism to return said deflector plate to the position as represented by the stored information.

8. The apparatus of claim 7 wherein said desired extended position is the position of said deflector plate prior to retraction thereof when the rotor is caused to operate in reverse mode.

9. The apparatus of claim 1 wherein said deflector plate is pivotable about said pivotal mounting to be transversely extendable within the discharge opening between a generally upstanding orientation and a range of orientations at acute angles to the upstanding orientation.

10. The apparatus of claim 1 wherein the rotor of the threshing system is rotatable within a concave for expelling the flow of crop residue into the discharge opening for delivery into a discharge passage extending downwardly into the crop residue distribution system, said discharge opening having an internal side on the downward swept side of the rotor, and wherein said deflector plate is mounted adjacent to said internal side and positioned to be movable into the path of the flow.

11. The apparatus of claim 1 wherein the rotor includes an outer surface, wherein a space exists between the outer surface and a concave within which space crop residue is helically moved towards the discharge opening, wherein said space has upsweep and downsweep sides when the rotor is being operated in a forward direction, and wherein the space has upper and lower quadrants at the discharge opening, and further wherein said deflector plate is movable into the flow at the downsweep side of the passage to intercept at least a portion of the flow of crop residue being expelled from the upper quadrant of the space.

12. The apparatus of claim 1 wherein the adjusting mechanism is operable to move the deflector plate within the path of the flow of the crop residue to effect an approximate centering of the flow of crop residue into the crop residue distribution system about an axial center line thereof.

13. Apparatus for adjustably transitioning a flow of crop residue being expelled into a discharge opening at the downstream end of a rotor of an axially arranged threshing system of an agricultural combine so as to flow into a crop residue distribution system of the combine, comprising:
a deflector construction including a deflector plate and an adjusting mechanism operable for moving the deflector plate,
said deflector construction mounted in the discharge opening,
said deflector plate being adjustably movable into and out of the path of the flow of crop residue when the crop residue is being expelled into the discharge opening such that, when said deflector plate is positioned in the path of the flow of the crop residue, at least a portion of the flow will impinge the deflector plate and be deflected thereby downwardly into the crop residue distribution system, and
said adjusting mechanism operable to controllably move said deflector plate between a retracted position generally out of the path of flow of the crop residue and at least one other extended position located in the path of the flow, including to effect retraction of said detector plate to said retracted position when the rotor is caused to rotate in reverse mode, wherein said adjusting mechanism is operable, upon completion of operation of the rotor in reverse mode, to effect a return of said deflector plate to a desired extended position.

14. The apparatus of claim 13 wherein said desired extended position is the adjustment position that said deflector plate was in prior to its retraction when the rotor was caused to operate in reverse mode.

15. The apparatus of claim 13 wherein said adjusting mechanism comprises a remotely controllable actuator.

16. The apparatus of claim 13 further including a control system operable to store information representative of a desired extended position of said deflector plate, said control system operable, upon completion of operation of the rotor in reverse mode, to effect operation of the adjusting mechanism to return said deflector plate to the position as represented by the stored information.

17. The apparatus of claim 16 wherein said desired extended position is the position of said deflector plate prior to retraction thereof when the rotor is caused to operate in reverse mode.

18. An agricultural combine, comprising:
an axially arranged threshing system including a rotor rotatable within a concave for discharging at the downstream end of said rotor a flow of crop residue into a rearwardly located downwardly facing discharge opening having an internal side on the downward swept side of said rotor for downward flow of the crop residue to and through a discharge passage extending downwardly and rearwardly to a crop residue distribution system of the combine;
a deflector construction disposed adjacent to said internal side of said discharge opening and having a deflector plate pivotally mounted at a position approximately the height of the axis of said rotor at its downstream end to be movable to a position such that at least a portion of the flow of crop residue will strike said deflector plate and be deflected thereby downwardly and transversely through the discharge passage toward the crop residue distribution system; and
an adjusting mechanism operable for moving the deflector in relation to the internal side for adjusting a transverse location at which the flow will enter the crop residue distribution system, wherein said deflector plate is pivotally mounted to be movable between a retracted position generally out of path of flow of the crop residue and at least one other extended position located in the path of the flow, and further wherein said adjusting mechanism is operable to effect retraction of said detector plate to said retracted position when the rotor is caused to rotate in reverse mode.

19. The agricultural combine of claim 18 wherein the adjusting mechanism is operable to move the deflector plate to effect an approximate centering of the downwardly flow about an axial center of the crop residue distribution system.

20. The agricultural combine of claim 18 wherein said deflector plate includes a tapered leading edge.

21. The agricultural combine of claim 18 wherein said deflector plate includes a face having a projecting vane thereon, said vane directing at least a portion of the flow of crop residue impinging said face.

22. The agricultural combine of claim 18 wherein said adjusting mechanism is operable, upon completion of operation of the rotor in reverse mode, to effect a return of said deflector plate to a desired extended position.

23. The agricultural combine of claim 22 wherein said desired extended position is the adjustment position that said deflector plate was in prior to its retraction when the rotor was caused to operate in reverse mode.

24. The agricultural combine of claim 22 wherein said adjusting mechanism comprises a remotely controllable actuator.

25. The apparatus of claim 22 further including a control system operable to store information representative of a desired extended position of said deflector plate, said control system operable, upon completion of operation of the rotor in reverse mode, to effect operation of the adjusting mechanism to return said deflector plate to the position as represented by the stored information.

26. The apparatus of claim 25 wherein said desired extended position is the position of said deflector plate prior to retraction thereof when the rotor is caused to operate in reverse mode.

27. An agricultural combine, comprising:
an axially arranged threshing system including a rotor rotatable within a concave for discharging at the downstream end of said rotor a flow of crop residue into a rearwardly located downwardly facing discharge opening having an internal side on the downward swept side of said rotor for downward flow of the crop residue to and through a discharge passage extending downwardly and rearwardly to a crop residue distribution system of the combine;
a deflector construction disposed adjacent to said internal side of said discharge opening and having a deflector plate mounted to be movable to a position such that at least a portion of the flow of crop residue will strike said deflector plate and be deflected thereby downwardly and transversely through the discharge passage toward the crop residue distribution system; and
said adjusting mechanism operable to controllably move said deflector plate between a retracted position generally out of the path of flow of the crop residue and at least one other extended position located in the path of the flow, including to effect retraction of said detector plate to said retracted position when the rotor is caused to rotate in reverse mode, wherein said adjusting mechanism is operable, upon completion of operation of the rotor in reverse mode, to effect a return of said deflector plate to a desired extended position.

28. The agricultural combine of claim 27 wherein said desired extended position is the adjustment position that said deflector plate was in prior to its retraction when the rotor was caused to operate in reverse mode.

29. The agricultural combine of claim 27 wherein said adjusting mechanism comprises a remotely controllable actuator.

30. The agricultural combine of claim 27 further including a control system operable to store information representative of a desired position of said deflector plate, said control system operable, upon completion of operation of the rotor in reverse mode, to effect operation of the adjusting mechanism to return said deflector plate to the position as represented by the stored information.

31. The agricultural combine of claim 30 wherein said desired extended position is the position of said deflector plate prior to retraction thereof when the rotor is caused to operate in reverse mode.

* * * * *